July 10, 1951  F. S. SPRING  2,560,493
REAR WINDOW FOR CONVERTIBLE BODIES
Filed May 7, 1948
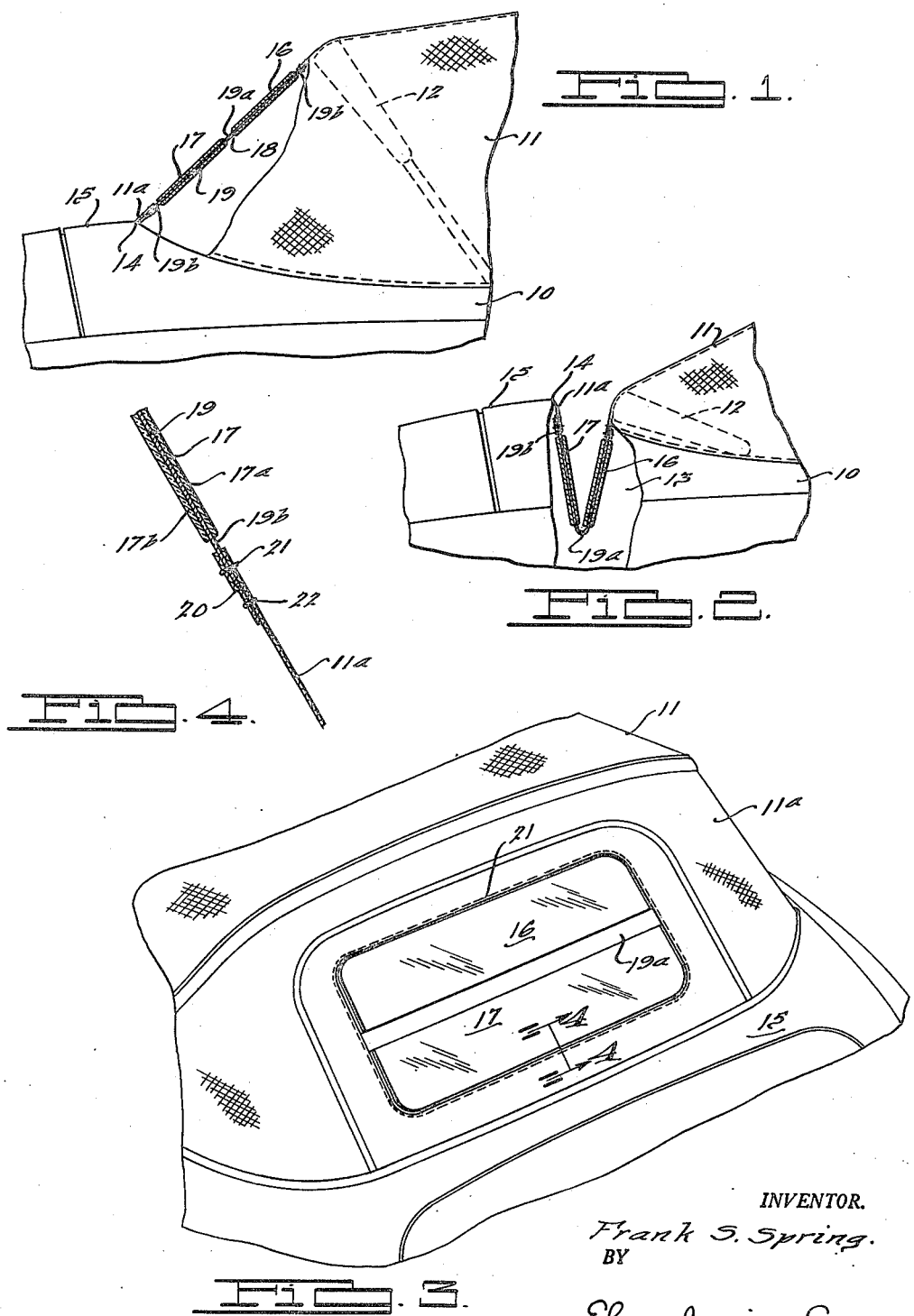
INVENTOR.
Frank S. Spring.
BY
Elmer Jamison Gray
ATTORNEY Patented July 10, 1951

2,560,493

UNITED STATES PATENT OFFICE 2,560,493

REAR WINDOW FOR CONVERTIBLE BODIES

Frank S. Spring, Grosse Pointe, Mich., assignor to Hudson Motor Car Company, Detroit, Mich., a corporation of Michigan Application May 7, 1948, Serial No. 25,725

8 Claims. (Cl. 296—145)

1

This invention relates to window panels and especially to rear window panels for vehicle bodies of the convertible type embodying foldable or collapsible top assemblies. In accordance with conventional practice the foldable top when extended into open position provides a fabric covering for the vehicle tonneau, mechanism usually being provided for accomplishing this operation and also for folding the top into a unit at the rear of the body.

Conventional foldable tops for convertible automobile bodies are provided with rear windows each comprising a single glass panel mounted in an opening in the rear portion of the foldable top material. In order to assure adequate rear vision for the operator of the vehicle, especially in connection with modern convertible bodies where the back portion of the foldable top has a gradual slope from the rear supporting bow toward the rear of the body, it is necessary to provide a rear glass panel which has a relatively great dimension in the direction of its height between the upper and lower edges thereof. However, when it is sought to use such a relatively large rear window the glass panel impedes or interferes with the folding action of the top, and as a consequence it has not been practicable or possible to utilize in modern convertible bodies as large a rear glass panel as is desirable in order to afford an adequate field of vision to the rear for the driver of the vehicle.

An object of the invention is to overcome the foregoing difficulties and to provide a rear window for a convertible body comprising foldable glass or transparent panels which together provide a window of adequate size when the top is open, yet which will fold together into compact relation when the top is folded rearwardly.

A further object of the invention is to provide in a convertible vehicle body a rear glass or transparent panel structure comprising a plurality of laminated panels hinged together and secured to the fabric of the top and adapted to shift into folded relation when the top is folded or collapsed.

Another object of the invention is to provide a foldable top having a rear window comprising a pair of laminated glass sections having the adjacent edges thereof separated and hingedly connected together through the medium of the flexible transparent bonding lamination interposed between the glass laminations.

Still another object of the invention is to provide a window glass for a convertible body composed of a plurality, such as two, laminated glass

2 panels hinged together to permit folding thereof, the panels having their adjacent horizontal edges spaced apart and joined together through the medium of a flexible transparent sheet or lamination of resinous or plastic material which forms a bonding layer between the glass laminations of the panels and also the means for hinging the panels together. Preferably this plastic sheet extends beyond the outer marginal edges of the panels to provide marginal attaching strips by means of which the window panel structure is attached to the top material within an opening therein.

Other objects of this invention will appear in the following description and appended claims, reference being had to the accompanying drawings forming a part of this specification wherein like reference characters designate corresponding parts in the several views.

Fig. 1 is a fragmentary side elevation, partly in section, illustrating the rear portion of a folding top for a convertible body in which the present invention is incorporated.

Fig. 2 is a fragmentary side elevation, in part similar to Fig. 1, illustrating the top in partially folded condition.

Fig. 3 is a fragmentary perspective view of the rear portion of the folding top when the latter is in open position.

Fig. 4 is an enlarged fragmentary section taken substantially through lines 4—4 of Fig. 3 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the invention as applied to a convertible automobile body 10 provided with a foldable or collapsible top assembly which may be of any conventional type comprising a flexible covering material 11 supported in the open position of the top by means of the usual upright bows, foldable side frame members and operating linkage. The covering 11 may be of any suitable fabric material, such as cloth or plastic material. In Figs. 1 and 2 there is shown at 12 the usual rear bow for supporting the rear portion of the fabric covering material when the top is in open position. In accordance with conventional practice the top is foldable rearwardly into a compartment or space 13 at the rear of the rear seat of the vehicle so as to be largely concealed when the top is down. The foldable top includes a back portion 11a which, when the top is open as shown in Fig. 1, slopes rearwardly from the upper edge of bow 12 and is attached at 14 along the front edge of the rear deck 15.

The back portion 11a of the top is cut out to provide a rear window opening within which is mounted a rear window comprising foldable glass sections constructed in accordance with the present invention. The rear window comprises a plurality, such as two, glass panels 16 and 17 which are laminated in construction to provide safety glass panels of any conventional type. The adjacent parallel edges of these panels are spaced apart at 18 a suitable distance, such as on the order of one inch, and in the present instance according to conventional laminated glass practice each panel comprises, as shown in Fig. 4, two glass laminations 17a and 17b and an interposed lamination 19 consisting of a relatively thin sheet of plastic material. The plastic sheet 19 is common to both panels 16 and 17 and, hence, has a portion 19a bridging the gap or space 18 between the panels to form a hinge section.

The plastic sheet 19, which lies between the glass laminations of each of the panels 16 and 17, may be of any suitable material which is not only flexible and transparent but also adapted to be permanently bonded to the glass laminations. For example, the sheet 19 may be composed of a vinyl ester resin, such as polyvinyl acetate, polyvinyl chloride, polyvinyl chloride-vinyl acetate, cellulose acetate or other clear resinous material suitable for laminated glass purposes. The plastic sheet 19 may be on the order of .045 of an inch in thickness and each of the glass laminations 17a and 17b may be on the order of .062 of an inch in thickness. In fabricating the rear window the sheet 19 in partial cured condition is interposed between the glass laminations of the two panels 16 and 17, and thereafter the several laminations are consolidated together under pressure and heat so as to permanently bond the laminations together in accordance with conventional laminated safety glass practice. The portion 19a, which bridges the narrow gap or space between the two panels 16 and 17, thus provides a flexible connecting medium between these panels. The sheet 19 is of such size as to project beyond the outer edges of the glass panels 16 and 17 to provide a continuous projecting attaching strip 19b extending along the top, bottom and sides of the glass panel assembly. The edges of the top fabric material 11a around the window opening therein overlap the attaching strip 19b of plastic material and are secured thereto and to an underlying reinforcing strip of fabric material 20 by a continuous line of stitching 21 extending entirely around the glass panels. The reinforcing strip 20, as shown in Fig. 4, projects beyond the marginal edges of the extension 19b and is additionally secured to the top material 11a by a second continuous line of stitching 22.

From the foregoing it will be seen that the intermediate lamination 19 of plastic material is common to both laminated glass panels 16 and 17 and projects beyond the outer edges thereof to provide the means for attaching the glass panels to the top material 11a around the margin of the window opening therein. Since the plastic liner 19, which bonds the glass laminations together, is highly flexible it will readily bend in the area 19a between the spaced edges of the panels 16 and 17. Hence, when the top is folded rearwardly in the manner shown in Fig. 2, the panels 16 and 17 will fold together in the compartment 13 and will occupy but approximately one half the space which otherwise would be taken up by the rear window if it were formed with a single solid glass panel as heretofore.

I claim:

1. In a convertible vehicle body, a foldable top having a rear window opening, a window mounted in said opening and comprising a plurality of laminated transparent panels having their adjacent edges separated, said panels having a plastic lamination common thereto and forming a hinge connection between said edges to permit the panels to fold together when the top is folded.

2. A window structure for the foldable top of a convertible vehicle body, comprising a pair of laminated transparent panels having their adjacent edges separated, said panels having a plastic lamination common thereto and forming a hinge connection between said edges to permit the panels to fold together when the top is folded.

3. A foldable top for a vehicle body, comprising flexible top material having a back portion, a window in said back portion comprising a plurality of transparent panels, each panel being composed of a plurality of glass sheets and a plastic sheet interposed therebetween, the adjacent edges of the glass sheets of the panels being spaced apart, the plastic sheet being common to the panels and having a portion bridging the space between said edges to form a flexible hinge connection between the panels.

4. A window structure for the foldable top for a vehicle body comprising a plurality of foldable laminated transparent panels, and a plastic sheet having portions forming laminations for said panels and a portion hingedly connecting the panels together.

5. A foldable top for a vehicle body having a window composed of a plurality of foldable transparent panels, and a plastic strip disposed between each pair of adjacent edges of said panels and hingedly connecting the panels together.

6. A foldable top for a vehicle body having flexible top material, a rear window for said top comprising a pair of foldable laminated transparent panels spaced apart along adjacent horizontal edges, and a plastic sheet having portions forming laminations for both panels and a portion bridging the space between said edges and hingedly connecting the panels together.

7. A foldable top for a vehicle body having flexible top material, a rear window for said top comprising a pair of foldable laminated transparent panels spaced apart along their adjacent horizontal edges, and a plastic sheet having portions forming laminations for both panels and a portion bridging the space between said edges and hingedly connecting the panels together, said sheet also having projecting flexible marginal portions secured to said top material around said window.

8. A foldable top for a vehicle body having flexible top material, a rear window for said top comprising a pair of foldable laminated transparent panels spaced apart along their adjacent horizontal edges, and a plastic sheet having portions forming laminations for both panels and a portion bridging the space between said edges and hingedly connecting the panels together, said sheet having flexible portions projecting laterally of the panels and overlapping the top material around said window, a flexible reinforcing strip overlapping said projecting portions, and means for attaching said reinforcing strip, top material and projecting portions together.

FRANK S. SPRING.

REFERENCES CITED

The following references are of record in the file of this patent:

UNITED STATES PATENTS

| Number | Name | Date |
|---|---|---|
| 1,929,892 | Kellner | Oct. 10, 1933 |
| 2,002,596 | Westrope | May 28, 1935 |
| 2,141,842 | Lohrman | Dec. 27, 1938 |
| 2,202,690 | Fix | May 28, 1940 |
| 2,293,656 | McClain | Aug. 18, 1942 |